United States Patent [19]
Pocci

[11] Patent Number: 5,428,903
[45] Date of Patent: * Jul. 4, 1995

[54] MEASURING INSTRUMENT

[76] Inventor: Silvano Pocci, 9 Eric Dr., Kinnelon, N.J. 07405

[*] Notice: The portion of the term of this patent subsequent to Jun. 14, 2011 has been disclaimed.

[21] Appl. No.: 216,714

[22] Filed: Mar. 23, 1994

Related U.S. Application Data

[63] Continuation-in-part of Ser. No. 41,851, Apr. 2, 1993, Pat. No. 5,319,860.

[51] Int. Cl.⁶ .......................... G01B 5/08; G01B 5/12; G01B 5/18
[52] U.S. Cl. ........................................ 33/797; 33/542; 33/836; 33/558.01
[58] Field of Search ............... 33/709, 783, 792, 794, 33/795, 797, 798, 802, 836, 833, 542, 542.1, 548, 558.01, 558.4

[56] References Cited

U.S. PATENT DOCUMENTS

| | | | |
|---|---|---|---|
| 111,892 | 2/1871 | Williams | 33/548 |
| 2,339,720 | 1/1944 | Smith | 33/709 |
| 2,449,251 | 2/1950 | Marascio . | |
| 3,081,548 | 3/1963 | Schwartz | 33/797 |
| 3,225,447 | 12/1965 | Bryant | 33/792 |
| 4,982,505 | 1/1991 | Pocci | 33/542 |
| 5,171,248 | 12/1992 | Ellis | 33/542.1 |
| 5,319,860 | 6/1994 | Pocci | 33/797 |

FOREIGN PATENT DOCUMENTS

| | | | |
|---|---|---|---|
| 0821717 | 12/1937 | France | 33/797 |
| 184916 | 5/1907 | Germany . | |
| 0948818 | 9/1956 | Germany | 33/783 |
| 0192801 | 11/1982 | Japan | 33/783 |
| 0019279 | 6/1911 | United Kingdom | 33/797 |
| 0144996 | 1/1962 | U.S.S.R. | 33/792 |

Primary Examiner—Thomas B. Will
Attorney, Agent, or Firm—Thomas L. Adams

[57] ABSTRACT

An instrument can simultaneous measure a diameter of and a lateral distance along a workpiece. The instrument employs a first member having a longitudinal axis. The instrument also has a pincer device mounted on the first member to reciprocate along the longitudinal axis. This pincer device has a pair of arms mounted in a pincer-like fashion to enable measuring the diameter and the lateral distance along the workpiece. Also included is measurement system having a first and second mechanism. The first mechanism is coupled to the pincer device for providing in response to lateral translation of the pincer device relative to the first member a first readout corresponding to the lateral distance along the workpiece. The second mechanism is coupled to the pincer device for providing in response to angular displacement of the arms, a second readout corresponding to the diameter of a portion of the workpiece.

8 Claims, 5 Drawing Sheets

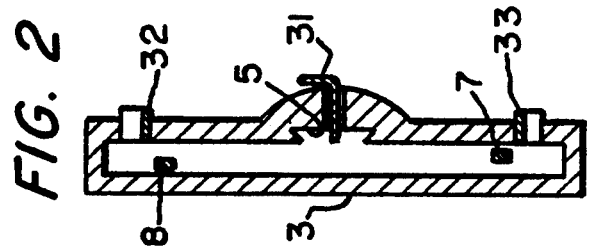
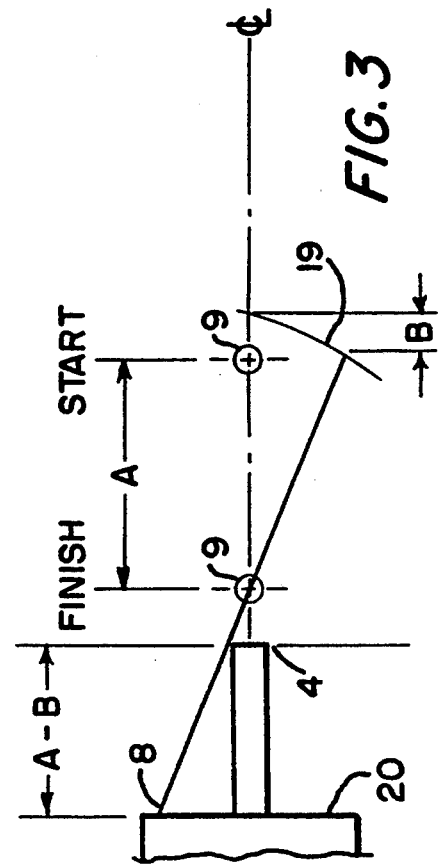
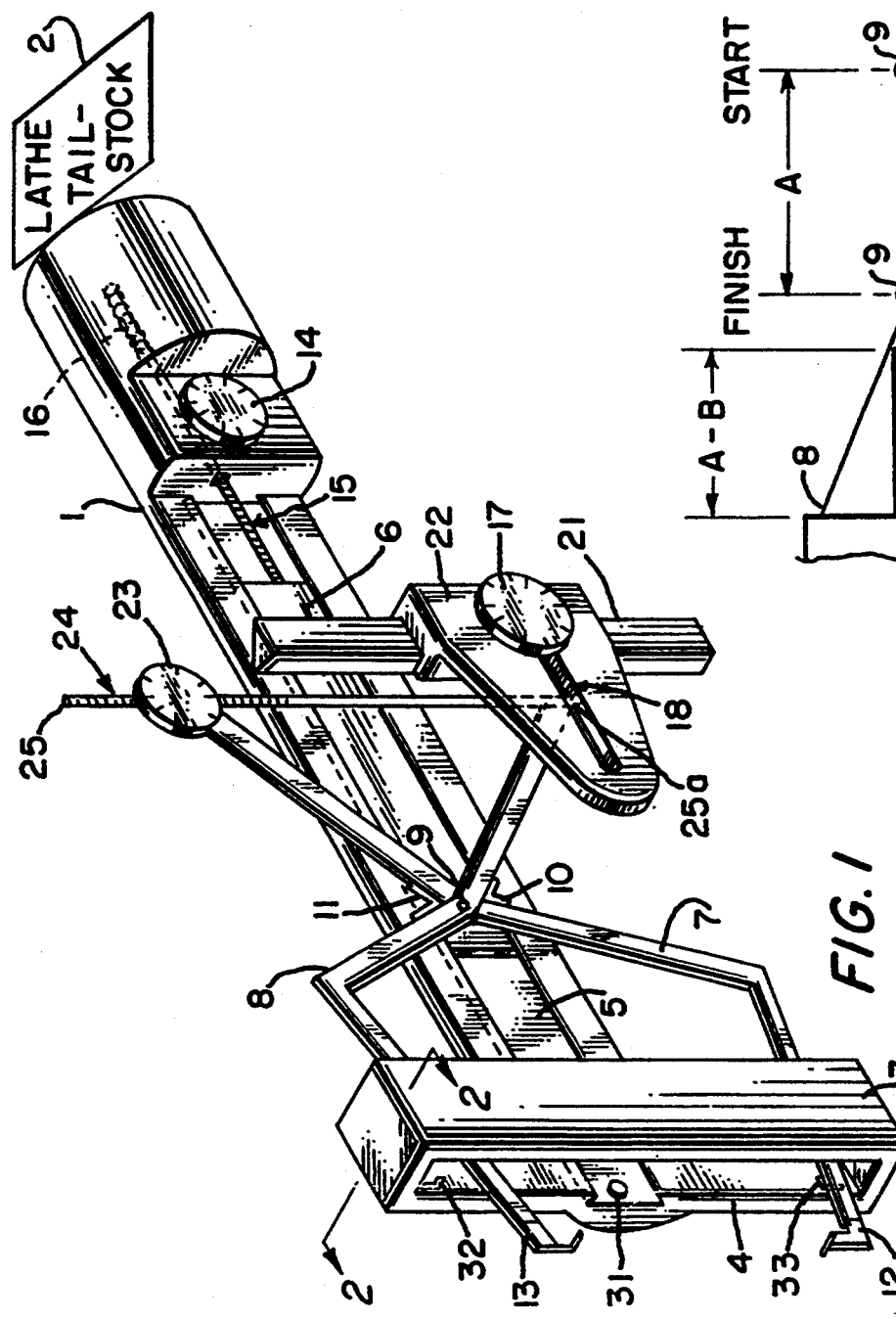

5,428,903

MEASURING INSTRUMENT

This application is a continuation-in-part of copending U.S. application Ser. No. 08/041,851, filed Apr. 2, 1993, entitled A MEASURING INSTRUMENT now U.S. Pat. No. 5,319,860.

BACKGROUND OF THE INVENTION

The present invention relates to measuring instruments in general and more particularly to an instrument for the simultaneous measurement of a diameter of and a lateral distance along a workpiece.

During the manufacture of mechanical parts by lathes or other machine tools it is necessary to measure the dimensions of the workpiece, such as the diameter thereof and the lateral distance from a given end of the workpiece to a shoulder formed therein. It is also necessary to use a measuring instrument for the inspection of these dimensions to make sure that predetermined tolerances are met. In the past, the internal and external diameter of surfaces of a workpiece and the lateral distance along the workpiece have been measured by calipers, micrometers and rulers which requires patience and is time consuming, since each diameter measurement and each lateral distance measurement must be made separately.

SUMMARY OF THE INVENTION

An object of the present invention is to provide an improved measuring instrument that reduces the time necessary to measure the diameter of and the lateral distance along a workpiece.

Another object of the present invention is to provide an instrument for the simultaneous measurement of a diameter of and a lateral distance along a workpiece.

Still another object of the present invention is the provision of a measuring instrument that will improve the quality control of the machining of mechanical parts or workpieces.

A feature of the present invention is the provision of an instrument for the simultaneous measurement of a diameter of and a lateral distance along a workpiece. The instrument includes a first member having a longitudinal axis. The instrument also has a pincer means mounted on the first member to reciprocate along the longitudinal axis. The pincer means has a pair of arms mounted in a pincer-like fashion to enable measuring the diameter and the lateral distance along the workpiece. The instrument also includes a measurement means having a first means and a second means. The first means is coupled to the pincer means for providing in response to lateral translation of the pincer means relative to the first member, a first readout corresponding to the lateral distance along the workpiece. The second means is coupled to the pincer means for providing in response to angular displacement of the arms, a second readout corresponding to the diameter of a portion of the workpiece.

BRIEF DESCRIPTION OF THE DRAWING

Above-mentioned and other features and objects of the present invention will become more apparent by reference to the following description taken in conjunction with the accompanying drawing, in which:

FIG. 1 is a perspective view of the measuring instruments in accordance with the principles of the present invention;

FIG. 2 is a cross-sectional view taken along line 2—2 of FIG. 1;

FIG. 3 is a diagram illustrating the formula employed in obtaining the actual, precise lateral distance measurement along a workpiece;

DESCRIPTION OF THE PREFERRED EMBODIMENTS

Figure 4:
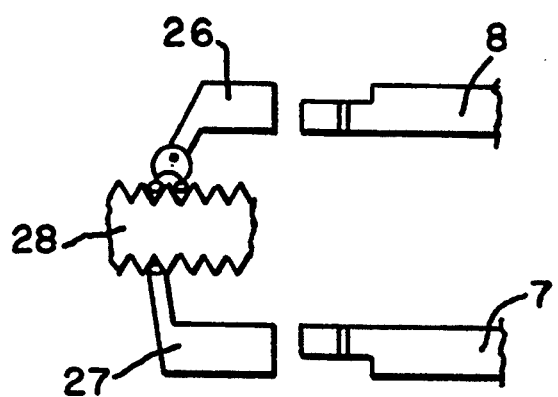
FIG. 4 is a plan view of different tips for the measuring arms interchangeable with those tips of FIG. 1.

Referring to FIG. 1, there is illustrated therein a perspective view of the measuring instrument in accordance with the principles of the present invention to enable the simultaneous measurement of a diameter of and a lateral distance along a workpiece. The measuring instrument includes a first member or main body 1 that can be mounted in a lathe tail-stock 2 or can be hand held. A second member 3 is secured to an end of member 1 having a reference surface 4 for the lateral distance measurement. In operation, reference surface 4 is positioned against an end of the workpiece from which the lateral distance is to be measured. First member 1 includes therein a track 5 which extends into member 3. A third member 6 is longitudinally slideable in track 5. A pair of measuring arms 7 and 8 (also referred to as a pincer means) are mounted to member 6 in a pincer-like fashion to pivot around pivot point 9. Arms 7 and 8 extend through member 3 to enable measuring the diameter of a workpiece and the lateral distance along the workpiece from reference surface 4 with the diameter and lateral distance measurement being performed on a given portion of the workpiece. Springs 10 and 11 are provided between the pair of arms 7 and 8 to bias arms 7 and 8 toward each other so that when the diameter measurement is made there is no slack in arms 7 and 8, but rather a positive contact is provided between the interchangeable tips 12 and 13 and the workpiece. A first means (part of a measurement means having a sensing means) including dial indicator 14 and a rack and pinion arrangement 15, with rack 15 being spring loaded by spring 16, provides a readout indicating the distance that pivot point 9 has traveled when arms 7 and 8 move from reference surface 4 to the given portion of the workpiece to make the lateral distance and diameter measurement. This readout is a part of the lateral distance measurement. Since the end of arm 8 travels in an arc as member 6 moves. This arc like-movement has to be accounted for to provide an accurate lateral distance measurement. This is accomplished by providing a second means (part of measurement means) having a dial 17 with a rack and pinion arrangement 18 connected to the adjacent end of arm 8 to provide a readout indicating the distance the end of arm 8 has moved in its arc when making the lateral distance and diameter measurement.

This method of obtaining actual measurement of the lateral distance is illustrated in FIG. 3 wherein the pivot point 9 moves a distance A from the start point to the finish point when measuring arm 8 is in contact with a given portion of the workpiece to which the lateral distance is measured from reference surface 4. As illustrated in FIG. 3 the end of arm 8 moves in an arc 19 as pivot point 9 moves laterally from the start to the finish point. The distance B is that distance which the end of arm 8 has moved in its arc 19. The actual, precise lateral distance from reference surface 4 to the shoulder 20 on the workpiece is obtained by subtracting the distance B from the distance A.

Continuing with the description of FIG. 1, dial 17 and rack and pinion arrangement 18 is slidably mounted on member 21 which is physically secured to member 6 for movement therewith. Dial 17 and rack and pinion arrangement 18 are carried by member 22 which is capable of sliding on member 21.

The end of arm 7 spaced from tip 12 is connected to a dial 23. Another rack and pinion arrangement 24, with the rack thereof formed on rod 25, operates dial 23 as arms 7 and 8 are moved to measure the diameter of a workpiece and dial 23 moves up or down in the rack portion of rack and pinion arrangement 24. End 25a of rod 25 is pivotably connected to rack and pinion arrangement 18 and the adjacent end of arm 8 so that rod 25 can move in an arc as arm 7 and 8 move to measure the diameter of the workpiece and dial 23 moves up and down in the rack arrangement 24. Dial 23 provides a readout of the diameter of the workpiece when tips 12 and 13 are biased in direct contact with the workpiece in the given portion thereof.

While rack and pinion arrangements 15, 18 and 24 have been illustrated to convert linear motion to circular motion, any other mechanism to accomplish this linear to circular motion could be employed. In addition, dials 14, 17 and 23 which provide the visual readout could be replaced with digital indicators to provide a digital readout of the dimensions which would encompass therewith the ability to record these measurements for the purpose of providing data for statistical process control.

Figure 5:
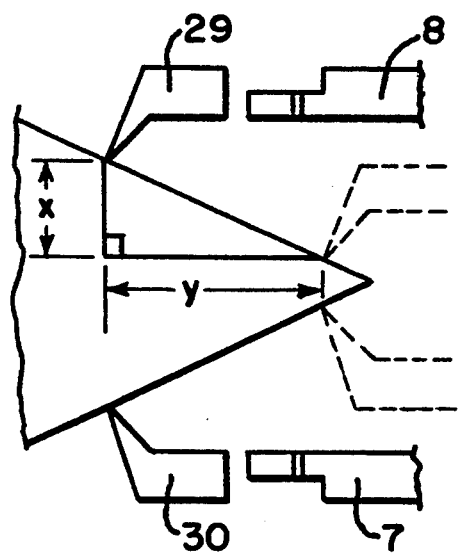
FIG. 5 is a plan view illustrating other tips for the measuring arms of FIG. 1 and another use for the measuring instrument of FIG. 1 in accordance with the principles of the present invention.

As mentioned above the tips 12 and 13 on arms 7 and 8 can be removed and interchanged with other specialized tips, such as illustrated in FIGS. 4 and 5. As illustrated in FIG. 4, the specialized tips 26 and 27 provide a three wire system for determining the actual measurement of threads of the threaded workpiece 28. As illustrated in FIG. 5, the specialized pointed tips 29 and 30 can be used to make any two readings of lateral distance and diameter to give the angle of the workpiece through trigonometry.

Figure 6:
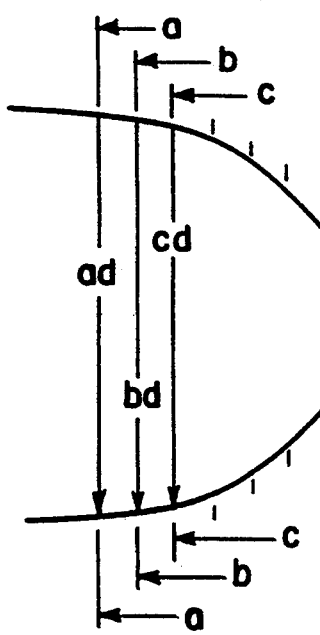
FIG. 6 is a plan view illustrating still another use for the measuring instrument of FIG. 1 in accordance with the principles of the present invention.

Referring to FIG. 6, it is illustrated therein that any contour of a workpiece can be plotted when an infinite number of lateral distances and diameters are obtained with the specialized tip similar to tips 29 and 30. Thus, any contour can be reproduced or duplicated when the infinite number of lateral distances and diameters are recorded and reproduced at a later time.

As illustrated in FIGS. 1 and 2, a stop 31 is provided in the track of member 3 to prevent member 6 from sliding out of track 5 unintentionally.

When arms 7 and 8 and their associated tips 12 and 13 are positioned within member 3 in a plane coincident with reference surface 4, the calibration of dials 14 and 17 to the zero start point for the lateral distance measurement is possible. When tips 12 and 13 of arms 7 and 8 are positioned to be in contact with one another, dial 23 can be calibrated to its zero point, and when tips 12 and 13 are placed on L-shaped members 32 and 33, it is possible to calibrate dial 23 for its maximum diameter readout.

Figure 7:
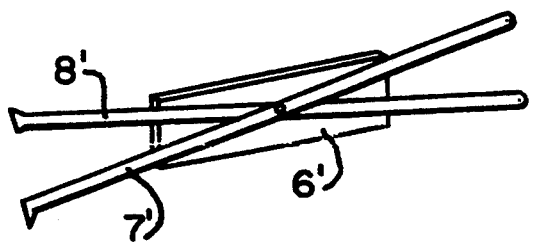
FIG. 7 is a perspective view of an alternative pair of arms employed in obtaining the internal diameter and lateral distance along a workpiece in accordance with the principles of the present invention.

As illustrated in FIG. 7, member 6' and its associated arms 7' and 8' can be substituted for member 6 and its associated arms 7 and 8 to provide measuring arms to measure the internal diameter of a workpiece. This is accomplished by disconnecting arms 7 and 8 from their associated rack and pinion arrangements 18 and 24, disconnecting member 6 from its rack and pinion arrangement 15, pulling stop 31 to an outward position so that member 6 and arms 7 and 8, after being disconnected from their rack and pinion arrangements, can be slid out of track 5 and then replaced by member 6' and arms 7' and 8' which are reconnected to the appropriate ones of the rack and pinion arrangements 15, 18 and 24.

The measuring instrument of the present invention can be used in forming the workpiece and in addition can be employed in inspection departments and has the ability to measure external diameters and the lateral distance from a reference surface to a given portion of a workpiece, such as a shoulder machined thereon as well as internal diameters and the lateral distance from a reference point to internal shoulders that may be machined on the workpiece. In addition, the measuring instruments of the present invention have interchangeable tips to enable measuring threads, angles and contours. The measuring instruments of the present invention replaces inside and outside calipers, vernier calipers, inside and outside micrometers and other depth measuring equipment.

Because of the ability of the measuring instruments of the present invention to be mounted directly upon the machinery involved in the manufacture of machined parts or workpieces all dimensions applicable to that operation can be visually verified.

More importantly, substitution of digital indicators for the dial indicators provides many additional benefits. The digital indicators can make a printed record of all the dimensions for each part. This printout can accompany each part to the final inspection department considerably reducing the need to reinspect each part. The printed readouts of all dimensions provide the necessary data which statistical process control systems require to function. Storage of the original digital printout tape provides a permanent record of the dimensional integrity of every part manufactured.

Figure 8:
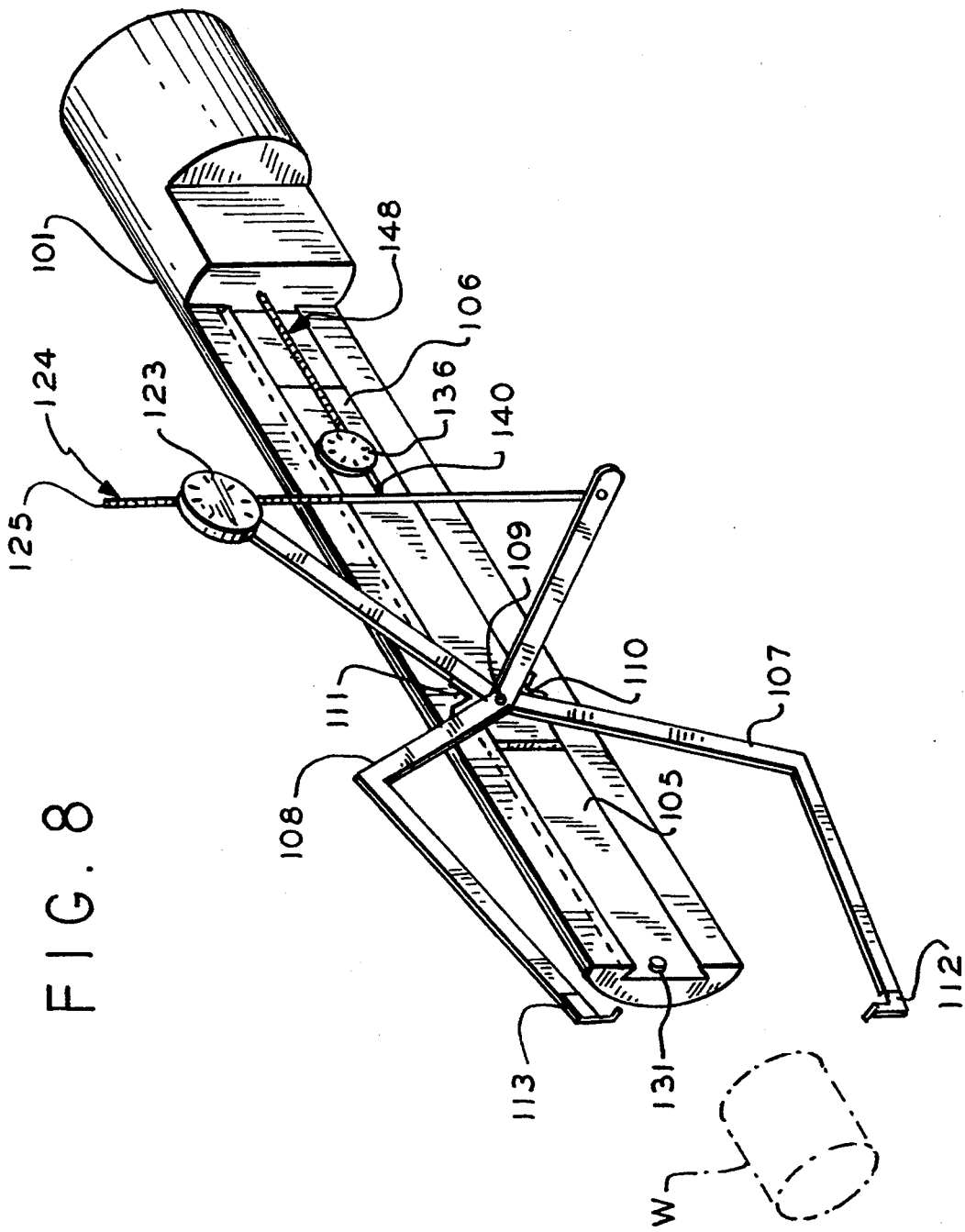
FIG. 8 is an axonometric view of an instrument according to the principles of the present invention, and which is an alternate to the embodiment of FIG. 1.
Figure 9:
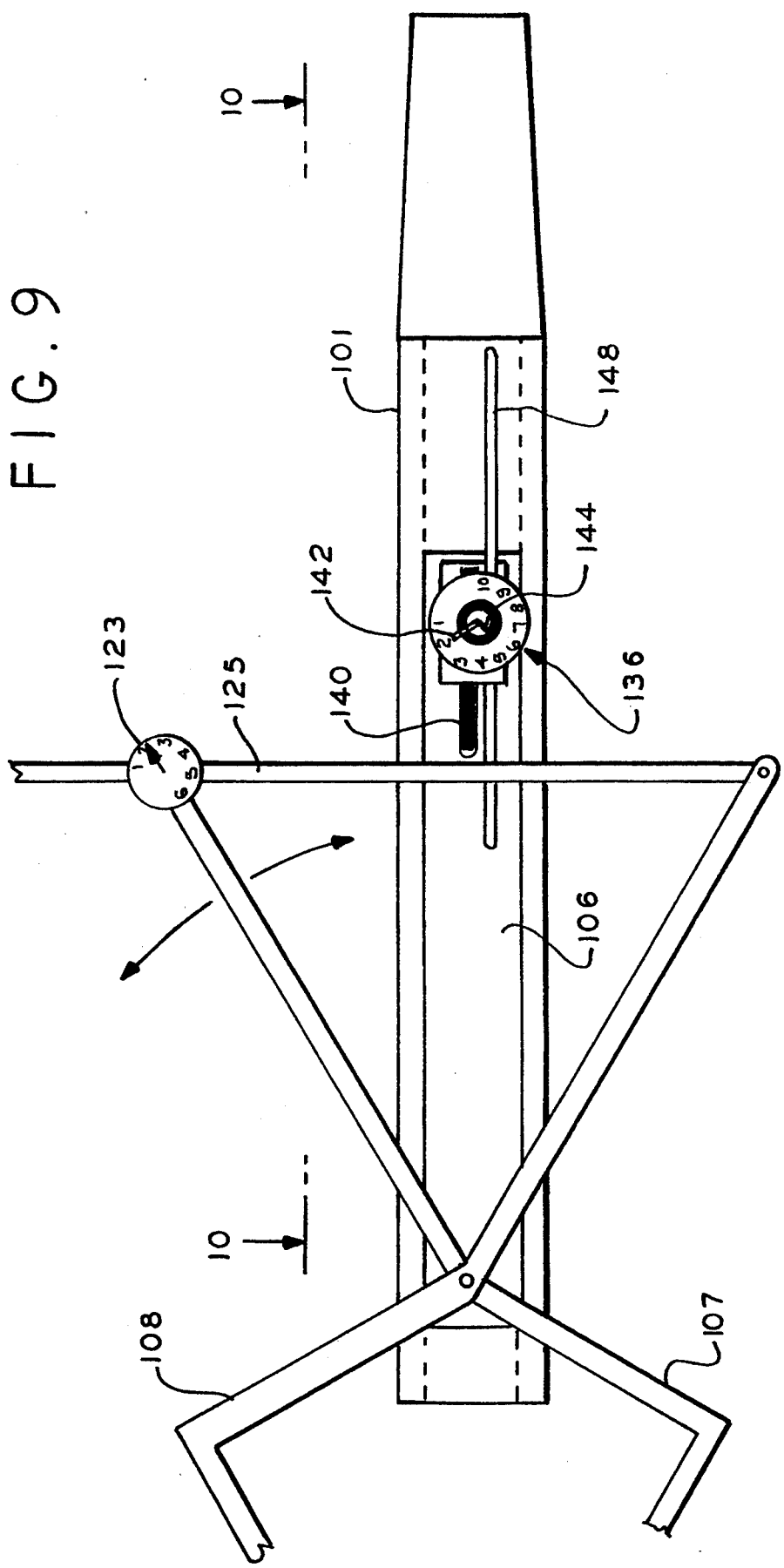
FIG. 9 is a side view of the instrument of FIG. 8 taken along the common axis of rotation of the pincer-like arms.
Figure 10:
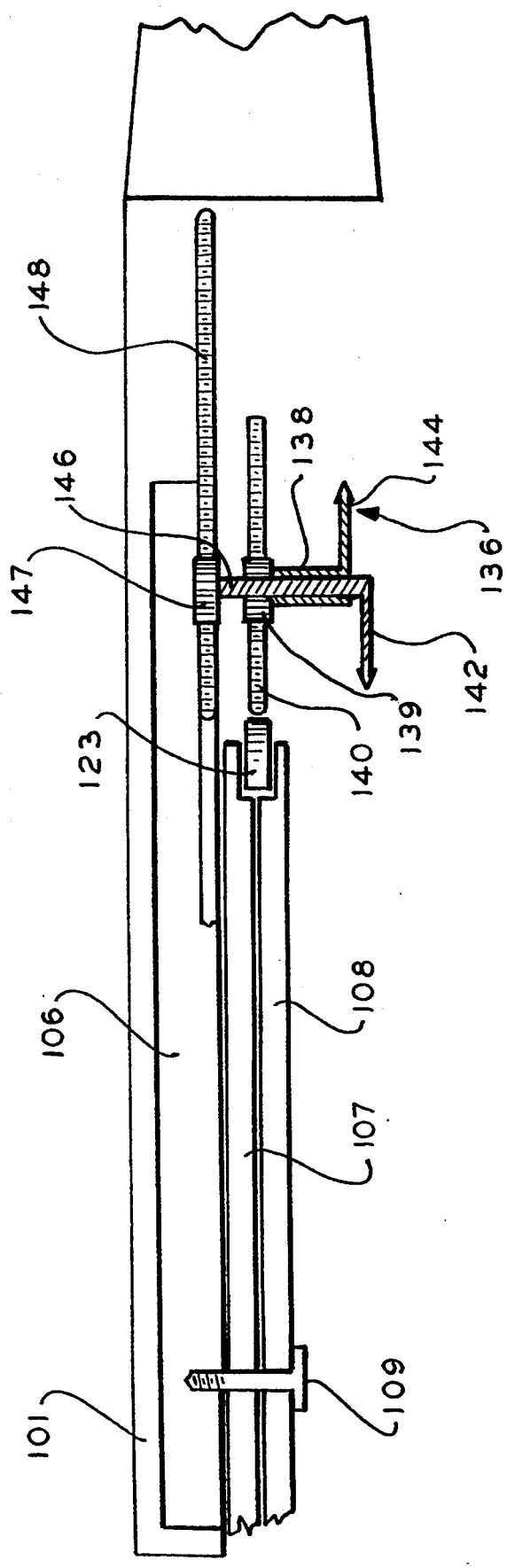
FIG. 10 is a top view of the instrument of FIG. 8, taken along line 10—10 of FIG. 9.

Referring to FIGS. 8–10, an alternate embodiment is shown employing components similar to that described in FIGS. 1–7. Elements corresponding to those previously illustrated have a reference numeral increased by 100. Essentially first member 101 has the same external shape as previously illustrated member 1 and carries a similar slide 106 slidably mounted in slot 105 (slot 105 corresponds to previously illustrated slot 5). Slide 106 slides along the longitudinal axis of first member 101. Stop 131 keeps slide 106 from leaving slot 105.

Arms 107 and 108 (referred to herein as a pincer means) have similar outer ends 112 and 113, respectively. Arms 107 and 108 are shown pivotally mounted in the same, pincer-like fashion to slide 106, and are commonly journalled at a common center of rotation 109.

A measurement means is shown herein employing a span indicator housing 123 corresponding to the previously illustrated dial (dial 23 of FIG. 1). Indicator housing 123 is also referred to as a second means for providing a second readout. Indicator housing 123 is pivotally attached to the inner end of arm 107. Rack 125 of rack and pinion 124 is pivotally connected to the inner end of arm 108. Rack 125 (also referred to as a span feeler) spans between the inner ends of arms 108 and 107 to indicate the separation of the inner ends of those arms. As before, rack 125 can move relative to the inner end of arm 107 to drive a pinion gear (illustrated hereinafter) inside housing 123 to provide a visual readout. As described previously, measuring the spacing between the inner ends of the arms 107, 108 is equivalent to measuring the spacing at the outer ends 112, 113 of the arms 107, 108.

The measurement means is also shown employing a sensing means (also referred to as a first means for providing a first readout) in the form of an indicator housing 136 having a pair of displays or indicators. The first indicator is shown as sleeve 138 (FIG. 10) whose inside end is affixed to gear 139, which is driven by a first feeler 140. (The mechanism inside the indicator housing 136 of FIG. 10 is shown in an exaggerated scale to clarify the workings of the mechanism). Feeler 140 is a rack similar to previously illustrated rack 125. Pointer 144 is affixed to sleeve 138 to rotate and provide a first readout when relative motion of rack 140 rotates gear 139 and sleeve 138.

A second indicator is shown herein as a shaft 146 coaxially mounted within sleeve 138 with an inner gear 147 to engage a second feeler 148, also in the form of a rack. Accordingly, relative motion of feeler 148 with respect to shaft 146 causes rotation of pointer 142 affixed to shaft 146, to provide a second readout.

In operation, first member 101 can be mounted in a lathe tail stock or in another fixture to maintain a fixed, reference position. In the instance where arms 107 and 108 are used to measure the dimensions on a cylindrical workpiece W, arms 112 and 113 are brought together and held against the proximate end of workpiece W by moving slide 106. The separation then between arms 112 and 113 is zero and the indicator 123 may be adjusted to give a readout of zero. Similarly, indicator 136 is adjusted to a zero reference point.

Thereafter, arms 107 and 108 can be manually rotated to straddle the cylindrical outside surface of workpiece W as outside ends 112 and 113 are moved from the reference point by moving slide 106. The spreading of the outer ends 112, 113 of arms 107, 108 is directly measured by the displacement readout given by indicator device 123. This readout is a direct measurement of the diameter of workpiece W.

Displacement of ends 112, 113 with respect to the longitudinal axis of first member 101 is measured with indicator device 136. Motion of the ends 112 and 113 with respect to the longitudinal axis is typically accommodated by motion of slide 106 relative to member 101. This motion is measured directly by motion of rack 148 turning gear 147 (FIG. 10). Gear 147 rotates shaft 146 and pointer 142 to give a direct readout of the longitudinal displacement of slider 106. This readout is equivalent to measuring the longitudinal displacement of the center of rotation 109 of arms 107 and 108.

The motion of slider 106 is not equivalent to the longitudinal displacement of ends 112 and 113, if arms 107 and 108 rotate. Ends 112 and 113 can separate and follow an arc that effectively retracts them with a component of motion along the longitudinal axis of member 101. (When ends 112 and 113 come together, the inner and outer ends extend, not retract. Still, relative to the original closed position of ends 112 and 113, ends are always deemed to have retracted.)

Retraction should be subtracted from the slide displacement measured by feeler rack 148 to obtain the true longitudinal displacement of ends 112, 113. This retraction can be measured by measuring the displacement of feeler rack 125 with respect to slide 106 and indicator device 136. For this purpose, one end of feeler rack 140 is kept in contact with rack 125. As arms 107 and 108 separate, rack 125 moves away from indicator device 136 and toward center 109. Consequently, feeler rack 140 turns gear 139 (FIG. 10) to rotate sleeve 138 and pointer 144.

The two readouts from indicator device 136 are then subtracted to provide the net displacement of ends 112, 113 along the longitudinal axis of member 101. Thus, this instrument can provide diametric and longitudinal measurements for a workpiece.

While I have described above the principles of my invention in connection with specific apparatus, it is to be clearly understood that this description is made only by way of example and not as a limitation to the scope of my invention as set forth in the objects thereof and in the accompanying claims.

I claim:

1. An instrument for the simultaneous measurement of a diameter of and a lateral distance along a workpiece comprising:
   a first member having a longitudinal axis;
   a pincer means mounted on said first member to reciprocate along said longitudinal axis, said pincer means having a pair of arms mounted in a pincer-like fashion to enable measuring said diameter and said lateral distance along said workpiece; and
   measurement means including:
   first means coupled to said pincer means for providing in response to lateral translation of said pincer means relative to said first member a first readout corresponding to said lateral distance along said workpiece; and
   a second means coupled to said pincer means for providing in response to angular displacement of said arms a second readout corresponding to said diameter of a portion of said workpiece.

2. An instrument according to claim 1 wherein said first means comprises:
   a sensing means coupled to said pincer means for providing a readout in response to lateral translation of said pincer means caused by (a) linear motion of said pincer means along said longitudinal axis of said first member, and (b) arcuate motion of said pair of arms.

3. An instrument according to claim 1 wherein said pair of arms has a common center of rotation, said sensing means comprising:
   a first indicator coupled to said arms to provide a readout corresponding to displacement of an end of one of said arms along said longitudinal axis; and a second indicator coupled to said arms to provide a readout corresponding to displacement of the common center of rotation of said arms along said longitudinal axis.

4. An instrument according to claim 3 wherein said first member comprises:
 a slide slidably mounted on said first member, said pincer means being mounted on said slide.

5. An instrument according to claim 1 wherein said pair of arms has a common center of rotation, said sensing means comprising:
 an indicator coupled to said arms to provide a first readout corresponding to displacement of an end of one of said arms along said longitudinal axis, and a second readout corresponding to displacement of the common center of rotation of said arms along said longitudinal axis.

6. An instrument according to claim 5 wherein said indicator comprises:
 an indicating housing mounted to move together with said common center of rotation;
 a first feeler mounted on said indicating housing and coupled to said pincer means for measuring displacement of an end of one of said arms in a direction along said longitudinal axis; and
 a second feeler mounted on said indicating housing and engaging said first member for measuring displacement of said indicating housing with respect to said first member.

7. An instrument according to claim 6 wherein said indicating housing has a pair of displays calibrated to show displacement of said first and second feelers with the difference between said first and second readouts signifying displacement of the outer end of one of said pair of arms along said longitudinal axis.

8. An instrument according to claim 6 wherein each of said pair of arms have on opposite sides of said common center of rotation an outer end and an inner end, said second means being mounted on at least one of the inner ends of said pair of arms and including:
 a span indicator housing; and
 a span feeler (a) slidably mounted in said span indicator housing, (b) extending between the inner ends of said pair of arms, and (c) engaging at least one of the inner ends of said pair of arms, said first feeler extending from said indicating housing to engage and be driven longitudinally by said span feeler.

* * * * *